United States Patent
Wine et al.

(10) Patent No.: US 10,901,302 B2
(45) Date of Patent: Jan. 26, 2021

(54) UNIFORM CLAMP

(71) Applicant: Axon Enterprise, Inc., Scottsdale, AZ (US)

(72) Inventors: Jason Wine, Kenmore, WA (US); Andrew Ambach, Bremerton, WA (US); Kevin Rhodes, Beaverton, OR (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 137 days.

(21) Appl. No.: 16/161,000

(22) Filed: Oct. 15, 2018

(65) Prior Publication Data

US 2019/0113058 A1    Apr. 18, 2019

Related U.S. Application Data

(60) Provisional application No. 62/571,853, filed on Oct. 13, 2017, provisional application No. 62/571,873, filed on Oct. 13, 2017.

(51) Int. Cl.

| | |
|---|---|
| *F16B 2/12* | (2006.01) |
| *A45F 5/02* | (2006.01) |
| *G03B 17/56* | (2006.01) |
| *A44B 99/00* | (2010.01) |
| *F16M 13/04* | (2006.01) |

(Continued)

(52) U.S. Cl.
CPC .......... *G03B 17/561* (2013.01); *A44B 99/005* (2013.01); *A45F 5/02* (2013.01); *F16B 2/12* (2013.01); *F16M 13/04* (2013.01); *G03B 17/566* (2013.01); *A45F 2200/0533* (2013.01); *B60R 11/04* (2013.01);

(Continued)

(58) Field of Classification Search
CPC .... G03B 17/561; G03B 17/566; F16M 13/04; F16B 2/12; F16B 21/04; A44B 99/005; B60R 2011/0078; B60R 11/04; A45F 2200/0533; A41F 1/00; A41F 1/008; Y10T 24/44034; Y10T 24/44265; Y10T 24/44017; Y10T 24/44504; Y10T 24/44598; Y10T 24/3698
See application file for complete search history.

(56) References Cited

U.S. PATENT DOCUMENTS

| | | | | |
|---|---|---|---|---|
| 1,399,730 A | * | 12/1921 | Abe | A41F 19/005 24/470 |
| 2,121,147 A | * | 6/1938 | Goodrich | A41F 5/00 24/460 |

(Continued)

*Primary Examiner* — Robert Sandy
*Assistant Examiner* — Rowland Do
(74) *Attorney, Agent, or Firm* — Andrew Terajewicz; Andrew Graham

(57) ABSTRACT

A clamp assembly removably couples to a sheet of material. An item, such as a body camera, mounted on the clamp assembly may be coupled to the sheet of material via the clamp assembly. A sheet of material is provided adjacent a base of the clamp assembly. An insert is provided adjacent the sheet of material on a side opposite the base. A clamp element is connected to the base and moves between an open position and closed position. Movement of the clamp element to the closed position resists removal of the base from the sheet of material. Embodiments of the present disclosure also involve clamp assembly bases, as well as systems for securing an item, such as a body camera, to the sheet of material.

20 Claims, 3 Drawing Sheets

(51) Int. Cl.
 *B60R 11/00* (2006.01)
 *B60R 11/04* (2006.01)
 *F16B 21/04* (2006.01)

(52) U.S. Cl.
 CPC ....... *B60R 2011/0078* (2013.01); *F16B 21/04* (2013.01); *Y10T 24/3698* (2015.01)

(56) References Cited

U.S. PATENT DOCUMENTS

| | | | | |
|---|---|---|---|---|
| 5,033,170 | A * | 7/1991 | Ewert | A41F 1/00 24/459 |
| 6,199,247 | B1 * | 3/2001 | Tsai | A47K 10/14 24/343 |
| 9,345,433 | B1 * | 5/2016 | Shinozuka | A61B 5/1115 |
| 9,568,144 | B2 * | 2/2017 | Pernu | F16M 11/041 |
| 9,737,102 | B1 * | 8/2017 | Sinclair | A41F 1/002 |
| 2008/0047110 | A1 * | 2/2008 | Doyle | A45F 5/02 24/3.12 |
| 2018/0008009 | A1 * | 1/2018 | Hawkins | A44B 17/0041 |
| 2018/0338585 | A1 * | 11/2018 | Hurley | A41F 1/00 |
| 2018/0338586 | A1 * | 11/2018 | Hopper | A44B 99/005 |

\* cited by examiner

UNIFORM CLAMP

CROSS REFERENCE TO RELATED APPLICATIONS

This application claims the benefit of U.S. Provisional Patent Application Ser. No. 62/571,853, filed on Oct. 13, 2017 and U.S. Provisional Patent Application Ser. No. 62/571,873, filed on Oct. 13, 2017, to which priority is claimed pursuant to 35 U.S.C. § 119(e), and which are both incorporated herein by reference in their entireties. This application is also related to U.S. Non-Provisional patent application Ser. No. 16/160,758 filed Oct. 15, 2018, which is also incorporated by reference in its entirety.

BACKGROUND OF THE INVENTION

It is often useful or necessary to secure an item onto a sheet of material, such as a fabric or item of clothing. As one example, it can be useful or necessary for a law enforcement officer to secure a body camera to the officer's uniform shirt. Such a connection is preferably made without damaging the shirt. To that end, connection mechanisms are sold that incorporate one or more magnets, and including a part that is placed inside the shirt. The parts of this mechanism are arranged in a manner so that magnetic attraction through the sheet material of the shirt holds the camera in place on the shirt.

One drawback of this mechanism is that the magnets must be very strong to hold a heavy camera in place. Also, lateral movement of the camera (sliding it along the surface of the shirt) can possibly dislodge the camera from the interior magnet. Finally, a magnetic mechanism can be painful if it closes on the user's finger, for example.

SUMMARY OF THE INVENTION

This summary is provided to introduce a selection of concepts in a simplified form that are further described below in the detailed description. This summary is not intended to identify key features of the claimed subject matter, nor is it intended to be used as an aid in determining the scope of the claimed subject matter.

In some embodiments according to various aspects of the present disclosure, clamp assemblies are provided. A clamp assembly comprises a base, an insert, and a clamping element movably connected with the base. The base has a bottom wall and side walls defining a clamping recess that is open at one end. The insert is configured and dimensioned to fit within the clamping recess of the base with a sheet of material located between the insert and the base. The clamping element is movable relative to the assembled base and insert, between (i) an open position in which the insert is removable from the clamping recess in the base and (ii) a closed position in which the insert is held snugly against the base bottom wall and side walls thereby capturing the sheet of material between the base and the insert and resisting removal of the base from the sheet of material.

In some embodiments, clamp assembly bases are provided. A clamp assembly base comprises a first side surface. The first side surface includes a base bottom wall and a side wall comprising a first side wall segment at an outer edge of the base. The outer edge is opposite on the first side surface from a location of a provided clamping element. The first side wall segment and base bottom wall are configured to receive a provided insert and a provided sheet of material and retain the sheet of material between the base bottom wall, first side wall segment, and the provided insert upon movement of the provided clamping element to a closed position. A clamp assembly base also comprises a second side surface. The second side surface includes a mounting portion configured to mount a body camera to the clamp assembly base and thereby secure the body camera to the sheet of material via the clamp assembly base.

In some embodiments, systems are provided. A system comprises a clamp assembly and a body camera. A clamp assembly comprises a base, insert, and clamp assembly. A base includes a mounting portion on a first side surface of the base and a bottom wall and a side wall segment on a second side surface of the base. An insert is configured to fit adjacent the bottom wall and the side wall segment with a sheet of material located between the insert and the bottom wall and between the insert and the side wall segment. A clamping element is movably connected with the base and movable relative to the base between (i) an open position in which the insert is removable from the base and (ii) a closed position in which the insert is held against the bottom wall and the side wall segment, thereby capturing the sheet of material between the base and the insert and resisting removal of the base from the sheet of material. The body camera is configured to be secured to the base at the mounting portion on the first side of the base.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DESCRIPTION OF THE INVENTION

In embodiments according to various aspects of the present disclosure, a clamp assembly is provided for securing an item to a sheet of material. In particular, certain embodiments relate to a clamp assembly that can be used to secure a body camera to a fabric material, such as a shirt. Embodiments according to various aspects of the present disclosure are applicable to various different clamp assembly constructions.

Figure 1:
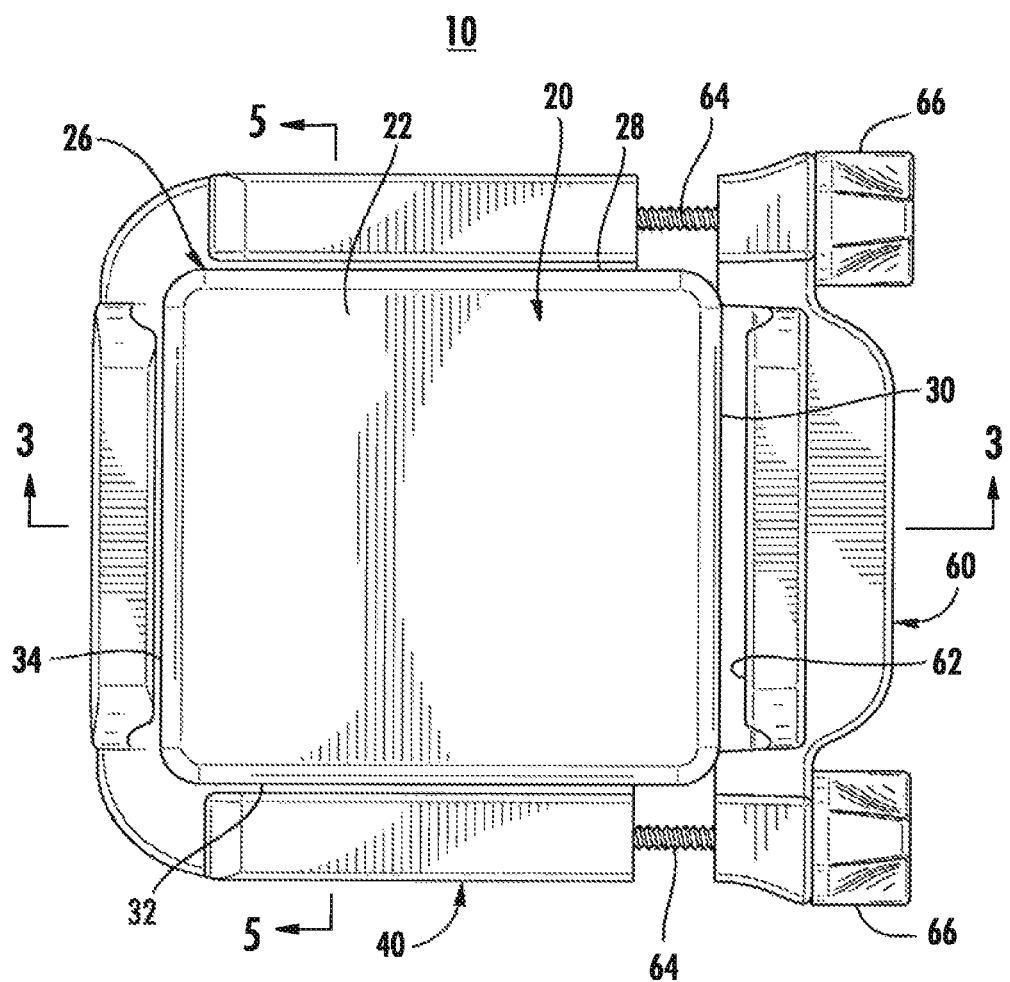
FIG. 1 is a top plan view of an example embodiment of a clamp assembly according to various aspects of the present disclosure.

As an example embodiment, FIG. 1 illustrates a clamp assembly 10. The clamp assembly 10 includes three parts—an insert 20, a base 40, and a clamp element 60.

Figure 3:
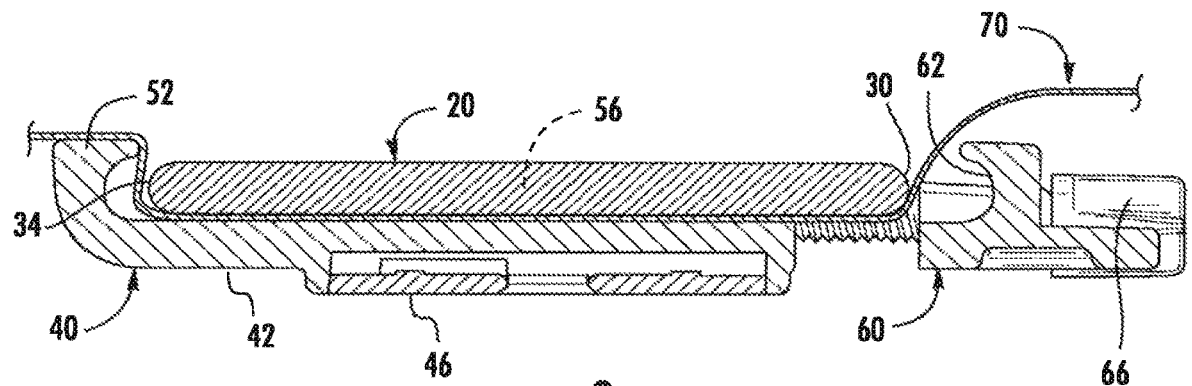
FIG. 3 is a sectional view taken along line 3-3 of FIG. 1, showing an example embodiment of the clamp assembly in an open position according to various aspects of the present disclosure.

An insert provides a physical structure that may be securely retained in a base. In the illustrated embodiment, the insert 20 is a flat, rectangular part (preferably square)

having parallel opposite major side surfaces 22 and 24 bounded by an outer peripheral edge portion 26. The edge portion 26 of the insert 20 preferably has a semicircular cross-sectional configuration, as best seen in FIG. 3. The edge portion 26 includes four edge segments that are numbered sequentially 28, 30, 32, and 34.

In embodiments, an edge portion may have an alternate number of edge segments, aside from the four edge segments illustrated in FIG. 1. For example, an insert may have three, five, six, seven, or eight edge segments. Each edge segment may meet at a defined angle, establishing a corner of the insert. Each edge segment may also have a straight edge or one or more planar surfaces. Edge segments with straight edges and/or defined angles between edge portions enable the insert to be securely coupled against a corresponding portion or length of a base and/or a clamping element. Such secure coupling may enable the overall assembly resist rotational forces that may be applied to a given part of the assembly.

For example, insert 20 includes right angles between each edge segment 28, 30, 32, and 34. Portions or lengths of each edge segment 28, 30, 32, and 34 are straight in dimensions and locations perpendicular to a semicircular cross-section of each edge segment. These portions are proximate corresponding surfaces of base 40 and clamp element 60, which may also be straight along such dimensions and locations. Particularly, a surface of an edge segment may be curved. For example, a surface may have a semi-circular cross section as noted above. A surface of an edge portion may be half-cylindrical in shape. Other manners of curves, across and along a surface, may be provided in embodiments.

Collectively, edge portions of an insert may be symmetrical, enabling the insert to be inserted and then retained in a base in a variety of orientations relative to the base. For example, a symmetrical shape of edge portion 26 permits insert 20 to be inserted into base 40 in a first orientation such that edge segment 30 is adjacent clamp element 60 as shown in FIG. 1. However, a shape of the edge portion 26 also enables the insert 20 to be rotated relative to base 40 to a second, different orientation relative to the first orientation, such that edge segments 28, 32, or 34 are adjacent clamp element 60. The first and second orientations may differ by rotational angles of 90, 180, and 270 degrees around an axis that extends out of major side surface 22. Portion of an insert 20 between two edge segments may also be equal, parallel, and/or symmetrical, which may also enable an insert to be disposed in a base in different orientations. Other angles between orientations are possible, depending on a number of edge segments of an insert and/or an angle between a given pair of edge segments relative to a center of the insert.

An insert may also be symmetrical about an axis between two edge segments of the edge portion. The axis may be a center axis, connecting center points of each of the edge portions. The two edge segments may be non-adjacent among the edge segments in an edge portion. A non-adjacent pair of edge segments have at least one other edge segment between the pair of non-adjacent edge segments. An edge segment may be defined, for example, based on a distance along an outer peripheral edge portion of a segment and/or between two defined angles along an outer peripheral edge portion of an insert. An insert may include two or more pairs of non-adjacent edge segments, wherein each edge segment of the outer peripheral edge portion is not included in more than one pair of non-adjacent edge segments. For example, an outer peripheral edge portion of an insert may include a first pair of non-adjacent edge segments and the insert may be symmetrical about an axis that intersects the first pair of non-adjacent edge segments of the outer peripheral edge portion. The outer peripheral edge portion of this clamp assembly may also include a second pair of non-adjacent edge segments, each edge segment in the second pair of non-adjacent edge segments different from both of the edge segments in the first pair of non-adjacent edge segments, where the insert is symmetrical about an axis that intersects the second pair of non-adjacent edge segments of the outer peripheral edge portion. Such symmetry increases a number of orientations in which an insert may be fit adjacent a base portion. For example, such symmetry may permit either side surface 22 or 24 of the insert 24 to be placed adjacent a bottom wall 44 of a base 40. Additional orientations decrease complexity of placing an insert in a base when the insert and base are on opposite sides of a sheet of material, particularly when the sheet of material is being worn by a user for example.

In the context of an example embodiment, an axis of symmetry may be defined, for example, from a vertical and horizontal center point on a surface of edge portion 30 to a vertical and horizontal center point on a surface of edge portion 34. Another axis of symmetry may also be defined, for example, from a vertical and horizontal center point on a surface of edge portion 28 to a vertical and horizontal center point on a surface of edge portion 32. Such additional axis or axes of symmetry enable an insert to be flipped and yet still be able to be inserted and retained between side walls 50-54 in a base 40. In these embodiments, either major side surfaces 22 or 24 may be placed adjacent inner major side surface 44 of base 40 and subsequently be retained by the base and clamp element. As noted above, this symmetry decreases the precision needed to place in an insert with an acceptable orientation on a side of a sheet of material opposite a base, which may be particularly useful when an insert is being used inside a shirt being worn by a user.

In embodiments, an insert may also be cylindrical, having two parallel major side surfaces, but a circular outer peripheral edge portion. Such embodiments enable the insert to be provided into base at a further variety of orientations. However, these embodiments may provide less resistance to rotational forces applied to a periphery of a base when coupled to an insert, compared to other embodiments in which a straight or non-round edge segment is provided in an edge portion of an insert.

An insert may be made of plastic and/or one or more other durable materials. A material selected for the insert that is able to withstand a compression force applied by a clamping element, such as clamp element 60.

A base provides a structure for receiving an insert. A base may provide a rigid structure resistant to compression and other forces that may be applied or encountered in an active environment. For example, one or more components of a clamp assembly may comprise a plastic material, the plastic material able to withstand forces that may be encountered in body-worn and/or law enforcement environments.

During use, a sheet of material may be disposed between the base and insert. Based on a shape of the base and the insert, the sheet of material may be held between the base and the insert. The sheet of material may be further secured to the base in accordance with movement of a clamping element. A base may provide a physical element to which an item may be secured.

In an example embodiment, base 40 in FIG. 3 is a generally flat piece having outer and inner major side surfaces 42 and 44. Inner major side surface 44 may provide a bottom wall of the base 40 on which an insert may be provided and selectively retained. The outer major side surface 42 of the base may be configured to include a mounting portion or mounting point 46 for mounting an item, such as a body camera (not shown). Side surfaces of a base may be parallel. Major side surfaces of a base may also be opposite each other on the base.

A mounting portion may include a recess or other physical structure configured to attached to an item. The mounting portion and the item may be selectively coupled and decoupled from each other. For example, mounting portion 46 may include a recess with an elongated opening and the item may include a T-bar structure shaped to be inserted into the elongated opening and rotated, thereby retaining the T-bar structure behind a wall panel in which the elongated opening is provided. An example elongated entry opening is shown in U.S. Provisional Patent Application No. 62/571,853, which is incorporated by reference herein. Mounting portion 46 may alternately or additionally include one or more clips, latches, textured protrusions or other fasteners for selectively engaging a corresponding component on an item to be mounted on the base. A surface of an insert may also be textured, providing an increased friction or resistance to movement in a direction tangential to the surface of the insert. In alternate embodiments, a mounting portion may be provided on different locations and/or sides of a base. In further alternate embodiments, a mounting portion may be provided on an insert, rather than a base. Embodiments according to various aspects of the present disclosure include a mounting portion disposed on at least one of a base, clamping element, and insert.

Figure 2:
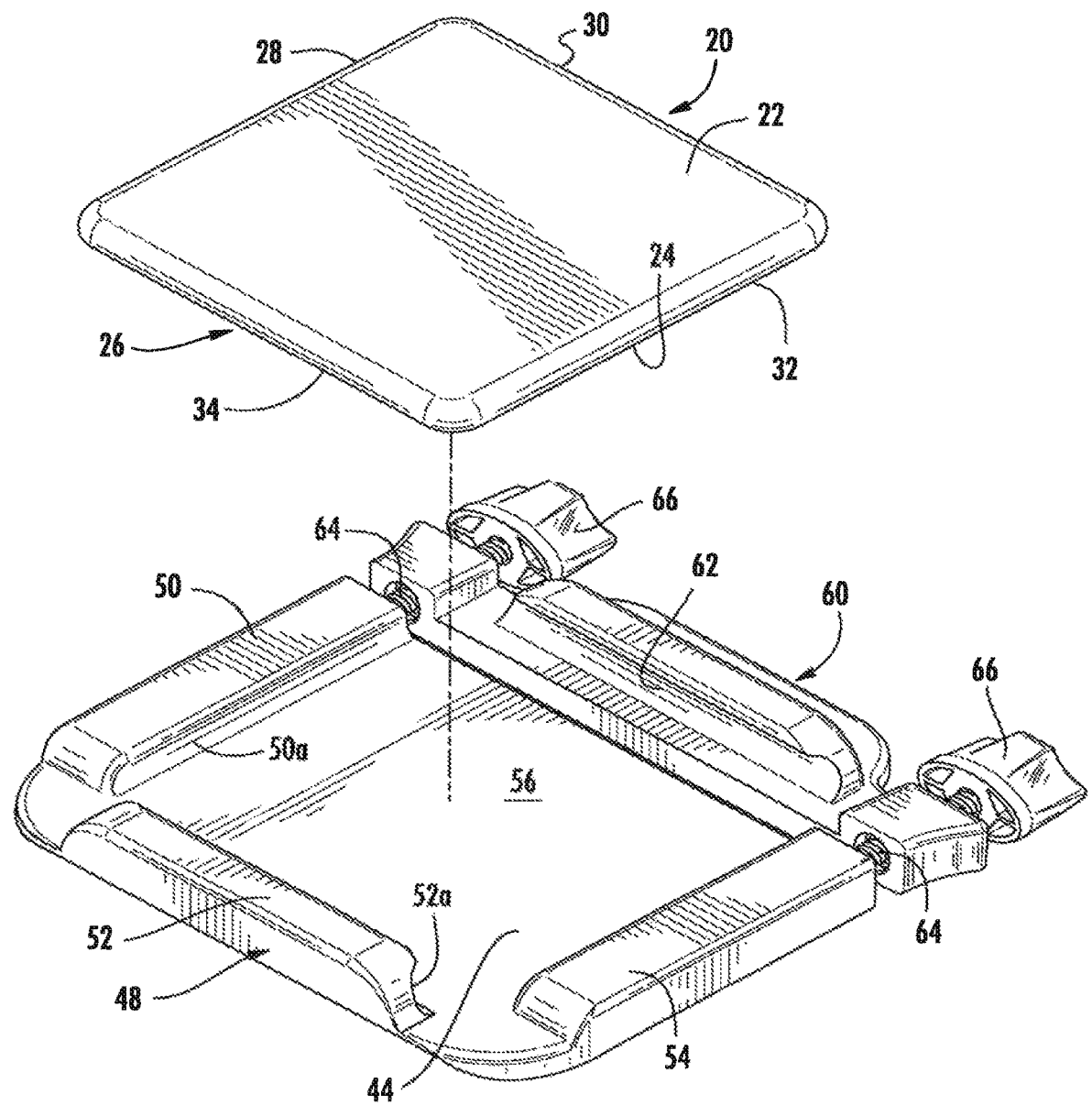
FIG. 2 is an exploded perspective view of an example embodiment of the clamp assembly according to various aspects of the present disclosure.

In the example embodiment of FIG. 2, inner major side surface 44 of the base 40 is bounded by a U-shaped base side wall 48. The base side wall 48 includes three side wall segments 50, 52, and 54 located at three outer edges of the base 40. The three side wall segments may include a retention side wall segment 52 and two guidance side wall segments 50, 54 in embodiments according to various aspects of the present disclosure. The three side wall segments 50-54 are fixed in position on the base 40. The three side wall segments 50-54 project away from (upward as viewed in FIG. 2) the inner major side surface 44 of the base. At least one side wall segment may be provided at an edge of the side surface opposite from a location at which a clamping element is provided adjacent the side surface. For example, side wall segment 52 is disposed at an edge of surface 44 opposite an edge of the surface 44 proximate and/or closest to clamp element 60.

Side wall segments in a base side wall may project to different heights above and away from an inner major side surface of the base. For example, a first side wall segment 52 may project or extend to a first height above surface 44, while one or both second side wall segments 50, 54 may project or extend to a second height above surface. The first and second heights may be different. The first height may be greater than the second height. Particularly, a first side wall segment may rise or extend a greater distance above a surface of a base than a distance by which a second side wall segment rises or extend above the surface. A height of a side wall segment may depend on a type of the side wall segment. For example, retention side wall segment 52 may rise or extend a greater distance above surface 44 than a distance by which guidance side wall segments 50 and/or 54 rise or extend above surface.

The base side wall 48 together with the inner major side surface 44 of the base 40 forms a clamping recess 56 in the base. The clamping recess 56 is slightly longer and wider than the insert 20. The clamping recess 56 is configured and dimensioned to closely receive the insert 20, with a sheet of material such as a uniform shirt (indicated schematically at 70 in FIGS. 3-5) laid between them. For example, a difference between corresponding dimensions of surfaces of a clamping recess or walls of a base and an insert may be greater than one millimeter, greater than two millimeters, or greater than at least three millimeters and/or less than three millimeters, less than four millimeters, less than five millimeter, or less than six millimeters. A difference may be selected in accordance with a thickness of a predetermined sheet of material to which a clamp assembly is to be securely attached. The difference may be determined in accordance with a clamp element in a closed position for a clamp assembly.

A retention side wall segment may prevent movement of an insert in at least two directions. A guidance side wall segment may prevent movement of an insert in a single direction. A retention side wall segment may prevent movement of an insert in more directions than a guidance side wall segment. A retention side wall segment may impose more physical limitation or impediment upon travel of an insert in contact with a base bottom wall of a base, independent of whether a clamp assembly is disposed in an open or closed position. For example, base side wall 48 prevents insert 20 from traveling in a direction associated with each of the base side wall segments 50-54. Retention side wall segment 52 prevents movement of the insert 20 past the retention side wall segment 52 in a direction between a center of surface 44 and the retention side wall segment 52. Guidance side wall segment 50 prevents travel of the insert 20 past the guidance side wall segment 50 in a direction between a center of surface 44 and the guidance side wall segment 50. Guidance side wall segment 54 prevents sliding of the insert 20 past the guidance side wall segment 54 in a direction between a center of surface 44 and the guidance side wall segment 54. Each of the side wall segments 50-54 are disposed at a respective edge of surface 44, defining recess 56 at each of the edges of the surface 44. Each side wall segment may provide a vertical structure and surface, extending away from a surface the base, configured to direct an insert to being seated in a proper position adjacent a bottom wall of a base as the insert is being received by the base. Such direction may be provided by side walls when a clamp assembly is in an open position, independent travel limitations imparted on the insert once it is seated in a proper position and/or upon movement of the clamp element to a closed position.

Figure 4:
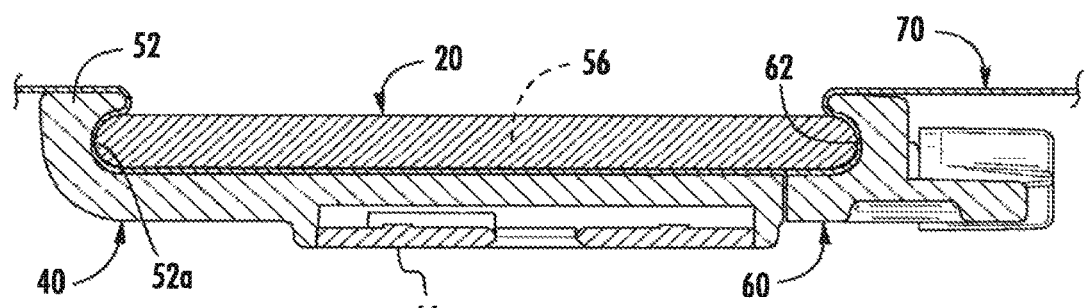
FIG. 4 is a sectional view related to FIG. 3, showing an example embodiment of the clamp assembly in a closed position according to various aspects of the present disclosure.

In embodiments, a base may include at least one side wall segment. A side wall of the base may include the at least one side wall segment. The one side wall segment may be a retention side wall segment. An insert may be dimensioned and configured to fit adjacent both the at least one side wall segment and a base bottom wall. An insert may be configured to fit adjacent the base bottom wall and the side wall segment with a sheet of material located between the insert and the base bottom wall and between the insert and the side wall. For example, as illustrated in FIG. 4, insert 20 is dimensioned and configured to fit adjacent both side wall segment 52 and a base wall with surface 44 of the base. Such a side wall segment and a base wall may form a minimum structure of a base necessary for securing an insert against the base. In these embodiments, the side wall segment may be disposed at an outer edge of a side surface of the base, where the outer edge is opposite on the side surface from a location at which a clamping element may be provided. A provided clamping element including upon further may include another side wall segment, thereby establishing a space in which an insert may be fit adjacent the base and secured in place by at least the side wall segment of the base, the bottom wall of the base, and the side wall segment of the clamping element.

In some embodiments, each edge of a base may include a side wall segment at an edge of a surface on which an insert is to be received, except for at least one edge adjacent to a location of a clamping element. At this at least one edge, the clamping element may provide one or more remaining wall segment(s), thus establishing wall segments on each side of an insert once the insert is provided in a clamping recess. This example arrangement provides a defined space in which the base may receive an insert, yet provides sufficient clearance for the insert to be placed into the defined space.

In embodiments, each side wall segment may include a curved inner surface. For example, each one of the three base side wall segments 50-54 has a respective curved inner surface 50a-54a. Each surface may be similar in configuration to one or more edge segments of the outer edge portion 26 of the insert 20. An inner surface of a side wall segment includes a surface positioned adjacent an insert upon placement of the insert adjacent a bottom wall of the base. Thus, an outer edge segment 28-34 of the insert 20 can be closely fitted against an inner surface of a base side wall segment 50-54, including when the parts 20 and 40 are assembled together as described below.

Figure 5:
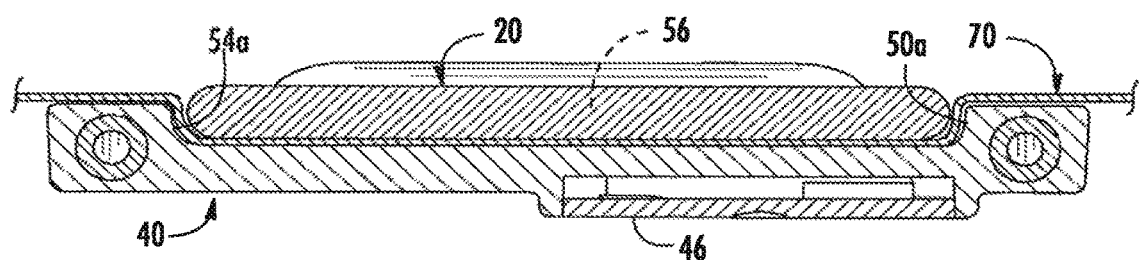
FIG. 5 is a sectional view taken along line 5-5 of FIG. 1, showing an example embodiment of a clamp assembly according to various aspects of the present disclosure.

Respective curved inner surfaces for different types of side wall segments may have different arc lengths and/or different arcs. For example, as shown in FIGS. 3 and 5, the respective curved inner surfaces 50a-54a for the base side wall segments 50-54 do not have a same arc length. Rather, an arc length for an inner wall of a retention side wall segment is greater than an arc length of an inner wall of a guidance side wall segment. For example, an arc length of inner surface 52a as shown in FIG. 4 is greater than an arc length of inner surface 50a or 54 as shown in FIG. 5.

An arc of a curved inner surface of a retention side wall segment, may, for example, be equal or less than one hundred and eighty degrees and/or greater than ninety degrees. An arc of a curved inner surface of a guidance side wall segment, for example, may, for example, be equal or less than ninety degrees. Such angles, as well as the corresponding arc lengths of the inner surfaces, enable a retention side wall segment to at least partially enclose a corresponding edge and surfaces of an insert. A portion of an inner surface of a retention side wall segment is above an insert when the insert is provided within a clamping recess. For example, inner surface 52a extends around and above a corresponding edge of insert 20 as illustrated in FIG. 4. In comparison, an arc and associated arc length of an inner surface of a guidance side wall segment runs along a corresponding edge and surfaces of an insert, but does not surround or cover this portion of the insert. For example, inner surface 54a of guidance side wall segment 54 extends along, but not over insert 20 as shown in FIG. 5. Insert 20 is not disposed between different, vertically opposite portions of inner surface 54a, while insert 20 is disposed between different, vertically opposite portions of inner surface 52a as shown in the example embodiments of FIGS. 4-5.

Side wall segments with inner surfaces that are not curved may be used in addition to or as an alternative to curved inner surfaces. Different shapes of surfaces may be provided. For example, an inner surface of a side wall segment may comprise one or more planar surfaces. A retention side wall segment surface may comprise one or more surfaces or planar surfaces disposed at an acute angle relative to a plane of an inner major side surface of a base. A guidance side wall segment surface may comprise one or more planar surfaces disposed at right angles or obtuse angles relative to a plane of an inner major side surface of a base. A retention side wall segment may include a surface that at least partially faces a surface of a bottom wall of the base. A direction perpendicular to this surface intersects the surface of the bottom wall of the base.

A guidance side wall segment may not include such a surface. Rather, a guidance side wall segment may include a surface that is disposed perpendicular or at an obtuse angle relative to a surface of a bottom wall of the base. A direction perpendicular to this surface does run parallel and/or extends away from the surface of the bottom wall of the base. A guidance side wall segment may only include surfaces at such angles or orientations relative to a surface of a bottom wall of a base.

In an example embodiment, upper parts of curved inner surface 52a, away from surface 44, are disposed facing toward surface 44 at acute angles relative to a plane of surface 44 as illustrated in FIG. 3. Upper parts of curved inner surface 50a, away from surface 44 are disposed facing away or at a right angle from a plane of surface 44 as illustrated in FIG. 5.

A clamp element is a moveable structure, coupled or configured to be coupled to a base. A clamp element may include a side wall segment, configured to be pressed against a sheet or material and/or in a direction of an insert provided on a bottom wall of a base. Movement of the clamp element may provide a force or pressure to a first side of an adjacent insert. The force may be provided through a sheet of material disposed between a surface of the clamp element and the first side of the adjacent insert. Based on the force or pressure, at least a second side of the insert, opposite the first side, may in turn contact the base, thereby securing the insert between the base and the clamping element. A clamp element may be coupled to at least one side of the base.

A clamp element may be adjustably coupled and moveable relative to a base via various fastener components. In an example embodiment of FIG. 3, two threaded fasteners are provided in the form of screw posts 64, though other forms and numbers of fasteners may be included. For example, a single threaded fastener may couple a clamp assembly to a base. Alternately, three or more fasteners or threaded fasteners may couple a clamp assembly to a base. Such fasteners enable the clamp element to move in a linear range of motion relative to the base.

In an example embodiment, clamp element 60 (FIGS. 2 and 3) has an inner surface 62. The inner surface 62 is arcuate. The inner surface 62 is similar in configuration to the outer edge portion 26 of the insert 20. An inner surface may be configured or shaped to align with different edge segments of an insert. A same inner surface may be shaped to match different outer surfaces of an insert. Thus, in an example embodiment, an outer edge segment 28-34 of the insert 20 can be closely fitted against the inner surface 62 of the clamp element 60 when the parts 20 and 60 are assembled together as described below.

In an example embodiment, clamp element 60 is movably connected to the base 40. Two externally threaded screw posts 64 support the clamp element 60 on the base 40 for sliding movement relative to the base, in a direction toward and away from the clamping recess 56. In this embodiment, clamp element 60 has a linear range of motion relative to base 40. In other embodiments, a clamp element may also have an alternate range of motion, including range(s) of motion that are non-linear and/or involve a rotational component.

In an embodiment according to various aspects of the present disclosure, screw posts 64 extend through respective through holes in the clamp element 60 and are threadedly received in the base 40. Thumbscrews 66 on the screw posts 64 enable the screw posts to be threaded into and out of the base 40. The thumbscrews 66 are engageable with the clamp element 60 to push the clamp element toward the base 40. The clamp element 60 thus forms a fourth wall around the clamping recess 56, selectively closing the open side of the U-shaped base side wall 48.

A clamp element may be moveable between an open and closed position without becoming completely decoupled from a base. A clamp element and base may remain assembled while moving from an open and closed position. A clamp element may remain physically attached to a base in both an open and a closed position. A clamp element may not separate from a base upon transfer to an open position from a closed position. A closed position may define a first relative position between a base and a clamping element, while an open position may define a second relative position between a base and a clamping element, yet the clamping element and base may both remain interconnected in each position. For example, screw posts 64 interconnect base 40 and clamp element 60 when clamp element 60 is pushed toward against base 40 as illustrated in FIG. 4. Screw posts 64 also interconnect base 40 and clamp element 60 when clamp element 60 is spatially separated from base 40 as illustrated in FIG. 3. As example embodiments according to various aspects of the present disclosure, FIG. 3 illustrates an open position of clamp element 60 relative to base 40 and FIG. 4 illustrates a closed position of clamp element 60 relative to base 40.

A clamp element may include one or more additional wall segments, aside from one or more wall segments provided on a base. Particularly, a clamp element may include one or more side wall segments, separate from one or more side wall segments disposed on a surface of a base. One or more wall segments provided on a clamp element may be retention side wall segments. For example, a wall segment on clamp element 60 may match or otherwise have one or more common features and/or shapes compared to a retention side wall segment, such as segment 52. Inner surface 62 may be a same size and/or shape compared to surface 52a. Similar to segment 52, a side wall segment on the clamp assembly may at least partially enclose a portion of insert 20 upon movement of the clamp element 60 to a closed position, such as shown in FIG. 4.

In embodiments according to aspects of the present disclosure, a base and an insert are placed on opposite sides of a sheet material of a uniform shirt. The clamp element is then operated so as to hold together the base and the insert. The sheet material of the uniform shirt is captured between the base to the shirt, and as a result, the base is secured to the shirt. The sheet of material may be held snugly against a base bottom wall and side walls, thereby capturing the sheet of material between the base and the insert and resisting removal of the base from the sheet of material. With the base secured to the shirt, an item (such as a body camera) that is mounted on the base can be supported on the shirt. A sheet of material held snugly to a shirt may not shift, slide, or otherwise move to a different location on the sheet of material upon application of a force. A force applied to a clamp assembly, for example, may be greater than gravity.

For example, to use the clamp assembly 10, a user places the insert 20 (FIG. 3) on one side of the sheet of material 70 and the base 40 on the opposite side of the sheet of material. The insert 20 is pressed or directed toward the base 40 (in a direction downward as viewed in FIGS. 3-5) and enters into the clamping recess 56 of the base. As such, insert 20 is fit adjacent a bottom wall or inner side surface 44 of the base 40, as well as side wall segment 52. The sheet of material 70 is captured between the insert 20 and the inner major side surface 44 of the base 40. The sheet of material 70 also is captured against three side wall segments 50-54 of the base side wall 48.

The clamp element 60 is then moved toward the clamping recess 56 (compare FIGS. 3 and 4) by tightening the thumbscrews 66. As this movement occurs, the sheet of material 70 is pinched tightly between the insert 20, the three base side wall segments 50-54, and the inner surface 62 of the clamp element 60. A side wall segment on the clamp element may be configured to press against a sheet of material when the clamp element is moved to a closed position. By pressing against the sheet of material, the side wall segment may further press the sheet of material against the insert, thereby retaining the sheet of material between the side wall segment of the clamp element and the insert.

For example, surface 62 of a side wall segment on clamp element 60 is pressed against the sheet of material 70 when the clamp element 60 is in a closed position. Retention side wall segment 52 is pressed against the sheet of material 70 when the clamp element 60 is in a closed position. Guidance side wall segments 50,54 are pressed against the sheet of material 70 when the clamp element 60 is in a closed position. Each of these segments or surfaces may be in contact with the sheet of material when the sheet of material is disposed between and insert and a base and a clamping element is in an open position, but the contact does not restrict or limit motion of the sheet of material relative to the base. An open position does not securely retain an insert to a base or a base to a sheet of material. When a clamp element is in a closed position, motion of the sheet of material relative to the base is prevented. A closed position may result in physical contact and force being applied to both sides of sheet of material at a common location on the sheet of material. Movement of a sheet of material is resisted by the clamp assembly when the clamp element is in a closed position. A closed position of a clamp element retains the sheet of material in the clamp assembly. A clamp element and a base may be assembled with each other in either an open position or closed position in embodiments according to various aspects of the present disclosure. A base and clamp assembly is removeably coupled to the sheet of material when a clamp element is in an open position and securely coupled to the sheet of material when the clamp element is in a closed position.

Based on a shape of each sidewall by which the sheet of material is captured, the sheet of material may be bent between surfaces of the insert. A shape of the bend may include at least two angles at which the sheet of material is turned upon compression between an insert and base. For example, a bend imposed by a retention side wall segment such as segment 52 or associated with surface 62 on clamp element 60, may involve a Z-shaped bend or fold in which a sheet of material 70 is bent with at least two acute angles when compressed between insert 20 at each of segment 52 or surface 62. Such a fold is illustrated in FIG. 4, for example. A bend imposed by a guidance side wall segment such as segments 50 or 54 may involve an S-shaped bend or fold in which a sheet of material 70 is bent with at least two right angles (and/or obtuse angles) when compressed between insert 20 at each of segments 50 or 54. A bend imposed by a guidance side wall segment may not fold a sheet of material back upon itself. A bend imparted by a guidance side wall segment may not fold a sheet of material in a manner in which one portion of the bend is positioned over another portion of the bend in a direction perpendicular from a side surface of a base. Such a fold is illustrated in FIG. 5, for example. In each of these examples, an angle of a bend may be continued in three-dimensional space along a depth of the corresponding elements of insert 20, base 40, and/or clamp element 60.

As a result of movement of clamp element 60, the base 40 and the insert 20 are clamped to the sheet of material 70. The sheet of material 70 is pinched or clamped between the base 40 and the insert 20. Further, any item such as a body camera that is mounted on the base 40 is secured in position on the sheet of material 70. This securement is, advantageously, obtained without damaging the sheet of material 70, which may be a uniform shirt, for example.

To release the clamp assembly 10, the user unscrews the thumbscrews 66, freeing the clamp element 60 for movement away from the base 40. When this movement occurs, surface 62 is not clamped against insert 20, which in turn, is not clamped against side wall segment 52. the sheet of material 70 is released from being pinched between the insert 20 and the base 40; the insert can be moved out of the clamping recess 56; and the base can be removed from the sheet of material. In this way, a body camera, for example, can be released from its position on a uniform shirt; the user only needs to catch the insert 20 that is located behind the shirt. When moving from a closed position to an open position, clamp element 60 may move over a linear range of motion away from the base.

In embodiments according to aspects of the present disclosure, a side wall segment may have a height above an inner major side surface that is greater than a thickness of an insert. The height may also be greater than a height or distance to which an insert extends above a base bottom wall upon capture of the sheet of material between the base and the insert. A side wall segment with such a height and that extends to this relative distance above an inner surface of a base bottom wall may be a retention side wall segment.

In same or different embodiments, a second side wall segment may have a height above an inner major side surface that is less than a thickness of insert. A second side wall segment may extend a distance above an inner major side surface that is less than a distance to which an insert extends above a base bottom wall upon capture of the sheet of material between the base and the insert. The second side wall segment may be a guidance side wall segment.

Such relative relationships may enable a first side wall segment to restrict movement of an insert in parallel and perpendicular directions relative to a plane of an inner major side surface of the base. Such relative relationship enables a second side wall segment to restrict movement of an insert in a parallel direction relative to plane of an inner major side surface of the base. For the second side wall segment, restriction of movement of the insert in a vertical direction relative to the inner major side surface of the base may not be provided by the second side wall segment. For a second side wall segment, restriction of movement of the insert in a vertical direction relative to the inner major side surface of the base may be imposed by other side wall segments.

For example, a side wall segment on clamp element 60 and side wall segment 52 extends to a greater height above surface 44 than insert 20 based on a thickness of insert 20 between surfaces 22 and 24 as illustrated in FIG. 4. A side wall segment 50 or 54 extends to a height above surface 44 less than insert 20 based on a thickness of insert 20 between surfaces 22 and 24 as illustrated in FIG. 5. A thickness of insert may be greater than a height of a second side wall segment above an inner major surface of a base, though less than a height of a first side wall segment above the same inner major surface of the base. In other embodiments, a second side wall segment may have a height greater than a thickness of an insert, though such embodiments may involve a vertical or near vertical inner surface adjacent the insert so as to allow the insert to be vertically inserted into a recess defined in part by such a side wall. The relative height or distance to which an insert extends above a base bottom wall may be provided in comparison to heights or protrusion distances of side walls, independent of whether a sheet of material is or is not provided between the insert and the base bottom wall. A relationship between such heights or distances may still apply when a sheet of material is disposed in a base. A thickness of a sheet of material may be minimal or at least less than a difference between distance to which a first side wall segment extends above a base bottom wall surface and a distance to which an insert extends above the base bottom wall when the sheet of material is not provided between the insert and the base bottom wall.

In such embodiments, a first distance to which a side wall surface extends above a bottom wall of a base may be greater than a second distance to which an insert extends above the bottom wall of the base. Such relative distances are shown in FIG. 4. Alternately, another or third distance to which a side wall extends above a bottom wall of a base may be less than a second distance to which an insert extends above the bottom wall of the base. An example of such distances is shown in a vertical direction of FIG. 5 for side walls 50,54 and insert 20. A distance to which an insert extends or does not extend above a base bottom wall may be less than or greater than a distance associated with a given side wall, independent of any additional distance imparted to an insert by inclusion of a sheet of material between the insert and the base. For example, a relationship between a second distance and a first or third distance may apply and remain, even upon capture of the sheet of material between the base and the insert.

In a clamp assembly of the present invention, no magnets are needed or used. Because the insert 20 and the clamping recess 56 are square, the insert 20 can be placed on the inside of the uniform shirt in any orientation and the clamp assembly 10 will still be workable.

The holding power of the clamp assembly 10 can be controlled by varying the tightness of the thumbscrews 66. For example, if the item (such as a camera) being supported is relatively heavy, or if the supporting fabric is thick or slippery, the thumbscrews 66 can be tightened more, resulting in a firmer clamping action. Additionally, inserts (or bases) of different relative dimensions can be provided to accommodate different fabrics or supported items.

Still further, a tightening means other than the thumbscrews can be provided on the base, such as an overcenter mechanism. An overcenter mechanism may involve a rotational angle of motion by which a clamping element is pressed or brought into contact with a sheet of material, thereby securing the sheet of material between the clamping element and insert. Such variations are considered to be part of the invention herein.

The foregoing description discusses embodiments, which may be changed or modified without departing from the scope of the invention as defined in the claims. For example, certain components or relationships between components may be excluded from some embodiments or optionally included in some embodiments. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising, "a housing, the barrel positioned in the housing", the barrel is not a claimed element of the apparatus, but an object that cooperates with the "housing" of the "apparatus" by being positioned in the "housing". The location indicators "herein", "hereunder", "above", "below", or other words that refer to a location, whether specific or general, in the specification shall be construed to refer to any location in the specification where the location is before or after the location indicator.

What is claimed is:

1. A clamp assembly comprising a base, an insert, and a clamping element movably connected with the base, the base having a bottom wall and side walls defining a clamping recess that is open at one end, the insert being configured and dimensioned to fit within the clamping recess of the base with a sheet of material located between the insert and the base; and the clamping element being movable relative to the base between (i) an open position in which the insert is removable from the clamping recess in the base and (ii) a closed position in which the insert is held snugly against the bottom wall and side walls of the base, thereby capturing the sheet of material between the base and the insert and resisting removal of the base from the sheet of material, wherein the clamping element moves in a linear range of motion between the open position and the closed position.

2. The clamp assembly of claim 1, wherein the insert has opposite, parallel major side surfaces bounded by an outer peripheral edge portion.

3. The clamp assembly of claim 2, wherein the insert is rectangular.

4. The clamp assembly of claim 2, wherein the outer peripheral edge portion has a semi-circular cross-section.

5. The clamp assembly of claim 2, wherein the outer peripheral edge portion includes a first pair of non-adjacent edge segments and the insert is symmetrical about an axis that intersects the first pair of non-adjacent edge segments of the outer peripheral edge portion.

6. The clamp assembly of claim 5, wherein the outer peripheral edge portion includes a second pair of non-adjacent edge segments, each edge segment in the second pair of non-adjacent edge segments different from the edge segments in the first pair of non-adjacent edge segments, and the insert is symmetrical about an axis that intersects the second pair of non-adjacent edge segments of the outer peripheral edge portion.

7. The clamp assembly of claim 1, wherein the insert is configured to be clamped in the clamping recess in a first orientation relative to the base and the insert is configured to be clamped in the clamping recess in a second orientation relative to the base, the second orientation being different from the first orientation.

8. The clamp assembly of claim 1, wherein a first side wall segment of the side walls extends a first distance above the bottom wall of the base, the first distance being greater than a second distance to which the insert extends above the bottom wall of the base upon capture of the sheet of material between the base and the insert.

9. The clamp assembly of claim 8, wherein a second side wall segment of the side walls extends a third distance above the bottom wall of the base, the third distance being less than a second distance to which the insert extends above the bottom wall of the base upon capture of the sheet of material between the base and the insert.

10. The clamp assembly of claim 1, wherein the base comprises a mounting portion, configured for mounting the base to a body camera.

11. The clamp assembly of claim 1, wherein the side walls comprise a plurality of side wall segments and an inner surface of each side wall segment of the plurality of side wall segments is curved corresponding to a shape of an outer peripheral edge portion of the insert.

12. The clamp assembly of claim 1, wherein the clamping element comprises a threaded fastener, the clamping element adjustably coupled to the base via the threaded fastener.

13. The clamp assembly of claim 1, wherein the clamping element includes a side wall segment, the side wall segment configured to press against the sheet of material when the clamping element is moved to the closed position.

14. A clamp assembly, comprising:
a clamping element; and
a clamp assembly base, comprising:
a first side surface, including:
a base bottom wall;
a first outer edge disposed adjacent to a location on the clamp assembly base at which the clamping element is physically attached to the clamp assembly base; and
a side wall comprising a first side wall segment at a second outer edge of the base and a second side wall segment, wherein the second outer edge is disposed on the first side surface opposite from the first outer edge, the first side wall segment and base bottom wall configured to receive a provided insert and a provided sheet of material and retain the provided sheet of material between the base bottom wall, the first side wall segment, and the provided insert upon movement of the clamping element to a closed position, and wherein:
the first side wall segment extends a first distance above the base bottom wall and the second side wall segment extends a second distance above the base bottom wall, the first distance being greater than the second distance; and
a second side surface opposite the first side surface, the second side surface including a mounting portion configured to mount a body camera to the clamp assembly base and thereby secure the body camera to the provided sheet of material via the clamp assembly base.

15. The clamp assembly of claim 14, wherein the first side wall segment is a retention side wall segment configured to prevent movement of the provided insert in at least two directions.

16. The clamp assembly of claim 15, wherein the second side wall segment is a guidance side wall segment configured to prevent movement of the provided insert in a single direction.

17. The clamp assembly of claim 16, wherein an inner surface of each of the first side wall segment and the second wall segment is curved.

18. The clamp assembly of claim 14, wherein the first side wall segment and the second side wall segment are perpendicular to one another.

19. The clamp assembly of claim 14, wherein the clamping element is configured to move in a linear range of motion relative to the clamp assembly base between an open position and the closed position.

20. A system comprising:
- a clamp assembly comprising:
  - a base, including:
    - a mounting portion on a first side surface of the base; and
    - a bottom wall and a side wall segment on a second side surface of the base;
  - an insert configured to fit adjacent the bottom wall and the side wall segment with a sheet of material located between the insert and the bottom wall and between the insert and the side wall segment; and
  - a clamping element movably connected with the base, the clamping element being movable relative to the base between (i) an open position in which the insert is removable from the base and (ii) a closed position in which the insert is held against the bottom wall and the side wall segment, thereby capturing the sheet of material between the base and the insert and resisting removal of the base from the sheet of material; and
- a body camera, configured to be secured to the base at the mounting portion on the first side of the base.

* * * * *